(12) United States Patent
Goodwin, III et al.

(10) Patent No.: US 7,260,622 B2
(45) Date of Patent: Aug. 21, 2007

(54) METHOD OF LIMITING ACCESS TO NETWORK SITES FOR A NETWORK KIOSK

(75) Inventors: John C. Goodwin, III, Suwanee, GA (US); John Brian Francis, Alpharetta, GA (US)

(73) Assignee: NCR Corporation, Dayton, OH (US)

( * ) Notice: Subject to any disclaimer, the term of this patent is extended or adjusted under 35 U.S.C. 154(b) by 663 days.

(21) Appl. No.: 09/727,291

(22) Filed: Nov. 29, 2000

(65) Prior Publication Data

US 2002/0065914 A1    May 30, 2002

(51) Int. Cl.
*G06F 15/173* (2006.01)
(52) U.S. Cl. ..................... 709/223; 709/203
(58) Field of Classification Search ............. 709/203, 709/217, 219, 223–224
See application file for complete search history.

(56) References Cited

U.S. PATENT DOCUMENTS

| | | | | |
|---|---|---|---|---|
| 5,761,071 A | * | 6/1998 | Bernstein et al. | 700/237 |
| 5,761,683 A | * | 6/1998 | Logan et al. | 715/513 |
| 5,826,267 A | * | 10/1998 | McMillan | 707/9 |
| 5,953,725 A | * | 9/1999 | Eprahim et al. | 707/103 R |
| 6,195,694 B1 | * | 2/2001 | Chen et al. | 709/220 |
| 6,256,739 B1 | * | 7/2001 | Skopp et al. | 726/2 |
| 6,286,029 B1 | * | 9/2001 | Delph | 709/203 |

\* cited by examiner

*Primary Examiner*—Ario Etienne
*Assistant Examiner*—LaShonda Jacobs
(74) *Attorney, Agent, or Firm*—Paul W. Martin

(57) ABSTRACT

A method of limiting access to network sites for a network kiosk which controls public operation of the kiosk. The method includes the steps of receiving a request to display the web page by the kiosk, determining an address of the web page, determining a current time, determining an unacceptable period of access to the web page, and preventing access to the web page if current time falls within the unacceptable period.

4 Claims, 3 Drawing Sheets

FIG. 2

| PAGE | CONTENT | DATE | TIME |
|------|---------|------|------|
| ----- | -------------- | ----- | ----- |
| ----- | -------------- | ----- | ----- |
| ----- | -------------- | ----- | ----- |
| ----- | -------------- | ----- | ----- |
| ----- | -------------- | ----- | ----- |
| ----- | -------------- | ----- | ----- |
| ----- | -------------- | ----- | ----- |

38

METHOD OF LIMITING ACCESS TO NETWORK SITES FOR A NETWORK KIOSK

BACKGROUND OF THE INVENTION

The present invention relates to self-service kiosks and more specifically to a method of limiting access to network sites for a network kiosk.

Retailers have a desire to sell their products over networks, such as global networks which are a part of the World Wide Web (WWW or "web") and which use the Transmission Control Protocol/Internet Protocol (TCP/IP protocol). These retailers wish to provide Internet server web sites which offer the same features as Internet server web sites available to home shoppers who use their computers to connect to the Internet server web sites.

Kiosks provide a publicly-accessible computing platform for displaying web pages from retailer web sites. Kiosks may be located within a retailer's transaction establishment or elsewhere, such as in shopping malls. Kiosks may be easily networked to retailer web sites using the TCP/IP protocol. Web pages from web sites may be displayed using known and available web software, such as Microsoft® Internet Explorer software.

One problem with allowing the general public to use a network kiosk is that an operator may choose not to visit web sites of the kiosk owner, thereby making the network kiosk less effective in promoting goods and services offered by the kiosk owner. However, if the kiosk owner were to prohibit any use of the network kiosk to access non-owner sites, use of the network kiosk would be less attractive to the general public and public use would fall off. Also, current methods of limiting access or "filtering" web site addresses used by web browser applications are not flexible enough to accommodate scheduled changes in access.

Therefore, it would be desirable to provide a method of limiting access to network sites for a network kiosk which makes the network kiosk attractive to both kiosk owners and to operators from the general public.

SUMMARY OF THE INVENTION

In accordance with the teachings of the present invention, a method of limiting access to network sites for a network kiosk is provided.

The method includes the steps of receiving a request to display the web page by the kiosk, determining an address of the web page, determining a current time, determining an unacceptable period of access to the web page, and preventing access to the web page if current time falls within the unacceptable period.

It is accordingly an object of the present invention to provide a method of limiting access to network sites for a network kiosk.

It is another object of the present invention to limit access by establishing time of day and date limits in certain restricted web sites.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a depiction of an access configuration file; and

DETAILED DESCRIPTION OF THE PREFERRED EMBODIMENT

Figure 1:
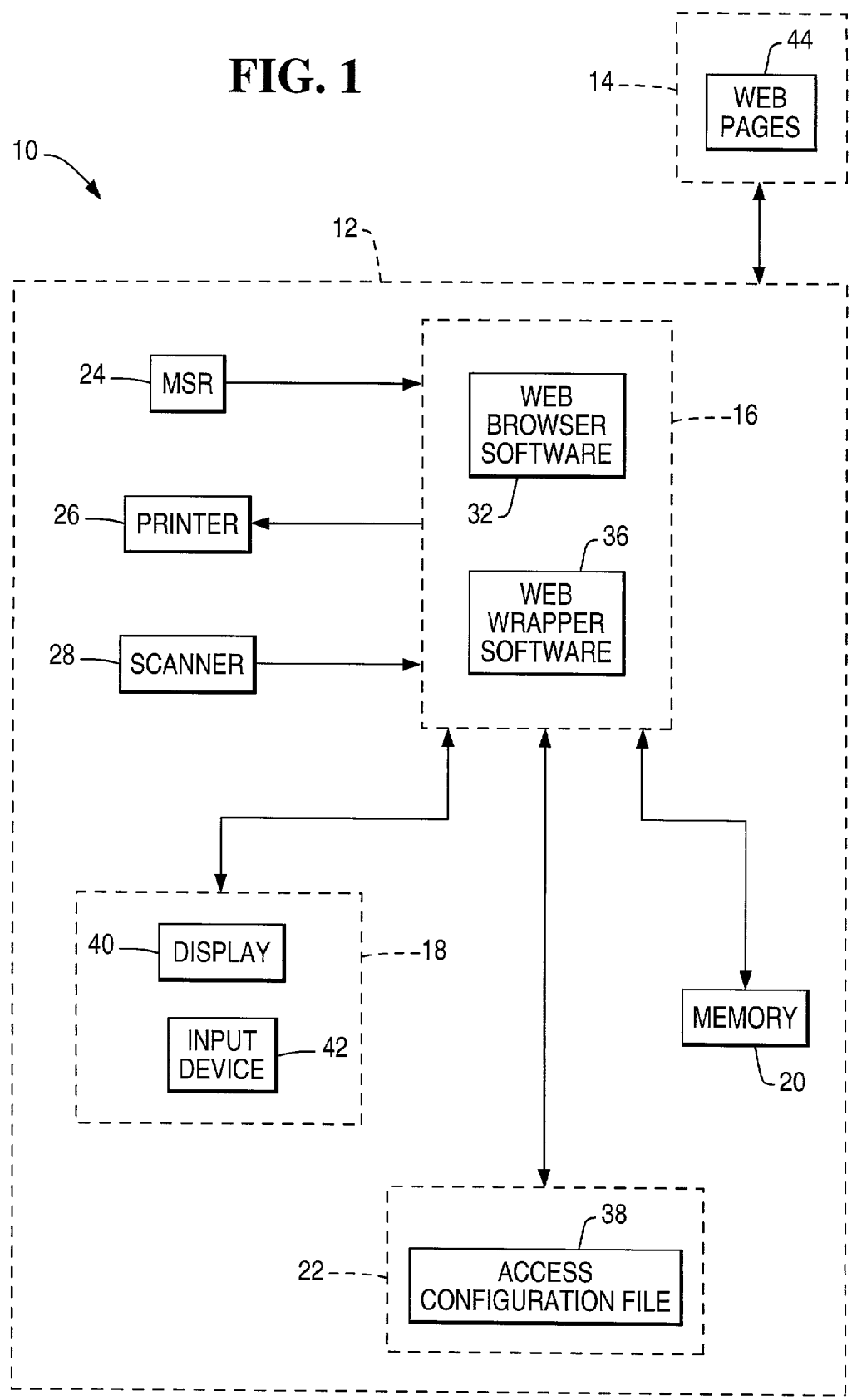
FIG. 1 is a block diagram of a transaction processing system including a network kiosk.

Turning now to FIG. 1, transaction system 10 includes kiosk 12 and server 14. Kiosk 12 is preferably located within a transaction establishment, such as a retail store, or transaction environment, such as a shopping mall. Kiosk 12 may include an NCR 7401 computer.

Kiosk 12 primarily includes processor 16, touch screen 18, memory 20, and storage medium 22. Kiosk 12 may additionally include a number of peripherals, including magnetic strip reader (MSR) 24, printer 26, and scanner 28.

To assist with execution of certain tasks performed by kiosk 12, kiosk 12 includes a built-in time keeping device, commonly referred to as a system clock, which is synchronized with current time, in order to automatically execute the tasks at their scheduled times.

Processor 16 controls operation of kiosk 12 and executes web browser software 32 and web wrapper software 36.

Web browser software 32 allows an operator to access information and purchase products from retailers through network 14, which preferably includes World Wide Web (WWW or "web") servers. Web browser software 32 may include commercially-available web browser software, such as Microsoft® Internet Explorer web browser software. Microsoft® Internet Explorer web browser software is configured into a kiosk operation using a "-k" command line option. This option hides toolbars and menubars to prevent operator access to those functions.

Web browser software 32 retrieves and displays web pages 44 from network 14, which includes a plurality of interconnected servers. Web pages 44 include web pages which display information about products and services offered by the kiosk owner as well as other web pages. Web pages 44 assist operators to find information about products sold by the kiosk owner and to complete purchases of such products. For this purpose, web pages 34 may include a start or "home" page which operates as a default page from which operation begins and to which operation returns when an operator is finished using kiosk 12. Web pages 44 may be written using hypertext markup language (HTML) or other suitable web page language.

Web wrapper software 36 provides security functions. During operation, web wrapper software 36 prevents an operator from accessing kiosk files, other applications, the operating system software, or basic input-output system (BIOS) firmware, and prevents the operator from causing kiosk 12 to reboot.

Under the present invention, web wrapper software 36 additionally limits access to network sites in a way which makes use of kiosk 12 attractive to both kiosk owners and to operators from the general public. To accomplish this objective, web wrapper software 36 constrains access to kiosk owner sites during certain dates and times.

The access limitations may be simple or complicated, depending upon the business objectives of the kiosk owner. For example, a kiosk owner who sells appliances may wish to limit access to certain web sites during the kiosk owner's normal business hours The kiosk owner may choose to not apply access limitations after normal business hours. Only the kiosk owners web site may be accessible. Alternatively, the kiosk owner may wish to additionally allow access to appliance manufacturer web sites. As yet another alternative, the kiosk owner may additionally wish to allow access to web sites which promote use of appliances. For example, if the kiosk owner sells ovens, the kiosk owner may wish to provide access to web sites which promote cooking in ovens by providing recipes. As yet another example, a kiosk owner may wish to provide web-based training to store employees, but only during non-business hours or non-peak hours.

Advantageously, kiosk 12 becomes a leveraged asset which is capable of performing many functions through access limitations. Access information by address, time, and date may be coded into web wrapper software 36 or listed in access configuration file 38 to allow a kiosk owner to control operation.

Touch screen 18 includes display 40 and input device 42. Display 40 and input device 42 may also be separate units. Input device 42 may record personal information from an operator.

Memory 20 is used by processor 16 to store executed program information, including web wrapper software information.

Storage medium 22 stores software including web wrapper software 36.

MSR 24 reads loyalty, credit, debit, SMART, and/or other types of cards carried by an operator. MSR 24 may record personal information from an operator.

Printer 26 prints information from web wrapper software 32, including information on web pages 44 from server 14. For example, printer 26 may print information relevant to a transaction completed by an operator using kiosk 12.

Scanner 28 reads bar codes on products to obtain product identification numbers. Kiosk 12 queries a transaction server with the identification numbers to obtain information about the product and displays the information.

Figure 2:
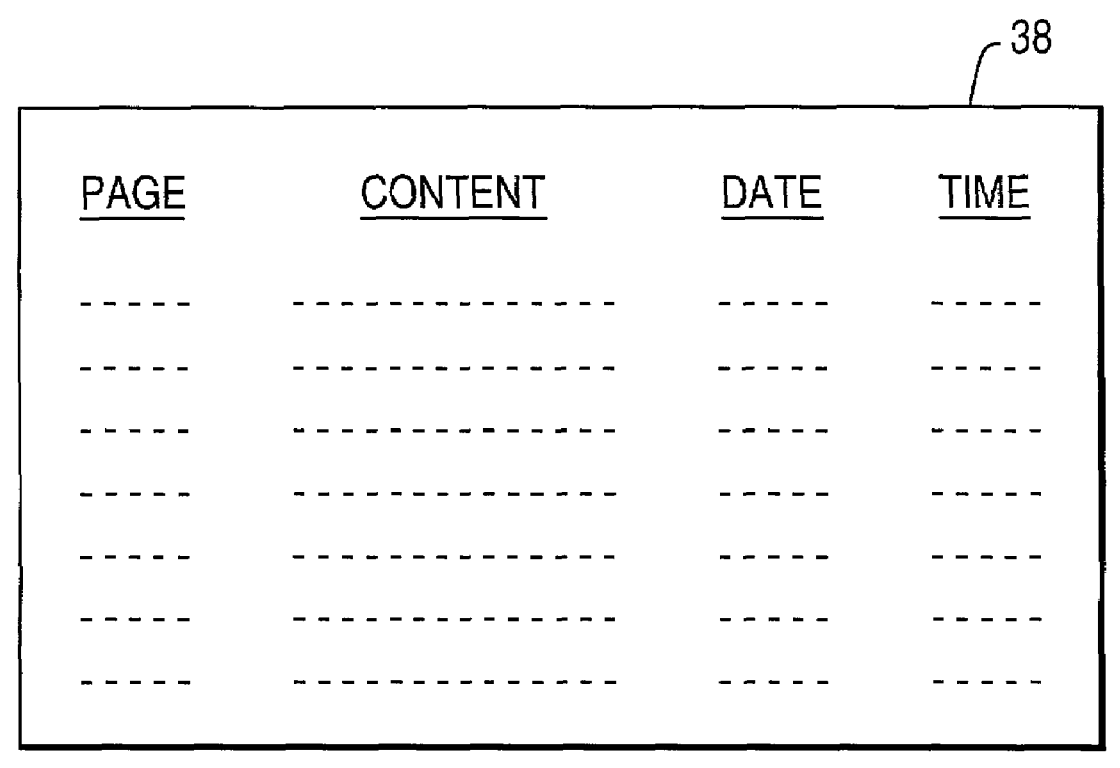

Turning now to FIG. 2, access configuration file 38 includes entries PAGE, CONTENT, DATE, and TIME.

Entry PAGE identifies a particular web address or Uniform Resource Locator (URL) for a web page to which the kiosk owner wishes to provide public access. Addresses not listed in access configuration file are not accessible. Web browser software 32 will display a standard error message if an operator attempts to access such addresses.

Entry CONTENT describes the content of the web page at the address of the corresponding page entry. Content information allows a kiosk owner to manage page entries.

Entry DATE identifies dates on which the web page is accessible.

Entry TIME identifies times of day at which the web page is accessible.

Web wrapper software 36 compares each address entered into web browser software 32 and with entries PAGE in access configuration file 38 to determine whether the address is listed. If the address is listed, web wrapper software 36 compares current time and date information to time and date information in the corresponding record in access configuration file 38.

Figure 3:
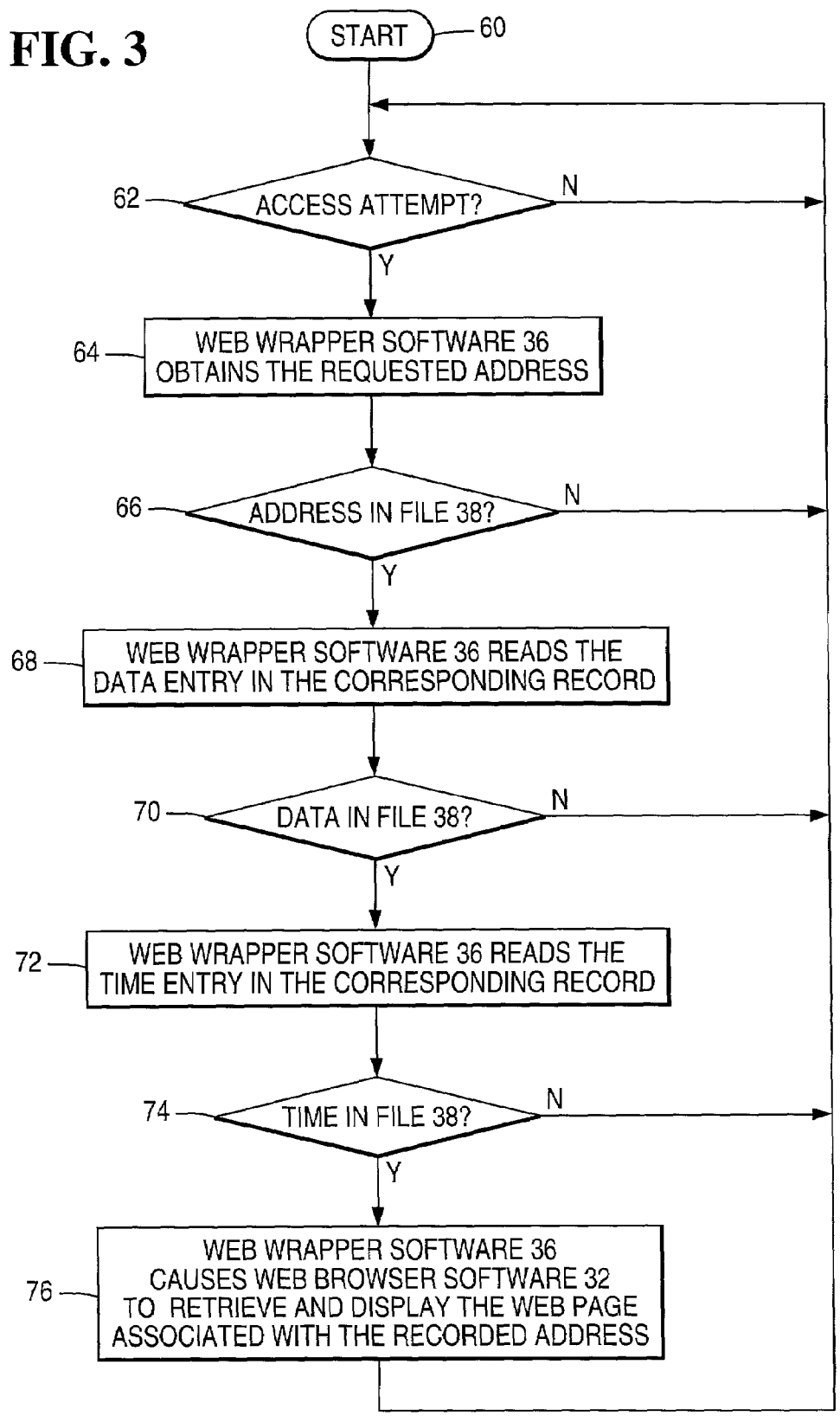
FIG. 3 is a flow diagram illustrating the access limitation method of the present invention.

Turning now to FIG. 3, the method of the present invention is illustrated beginning with START 60.

In step 62, web wrapper software 36 waits for a web page access attempt. An access attempt may be initiated by typing an address in one of web pages 44 provided by the kiosk owner for that purpose, for example, the start page, or by selecting a hypertext link in a displayed web page 44. Entry of an address into the address field of web browser software 32 may not be possible since web browser software 32 is not displaying its address field or other controls in the kiosk mode of operation.

In step 64, web wrapper software 36 obtains the requested address from web browser software 32.

In step 66, web wrapper software 36 compares the address to the addresses under entries PAGE in access configuration file 38. If the address of the web page is in one of the records in access configuration file 38, operation proceeds to step 68, otherwise access is denied and operation returns to step 62 to wait for another page to be displayed. Web wrapper software 36 preferably provides an indication to the operator that access has failed and may additionally redisplay the previously displayed web page.

In step 68, web wrapper software 36 reads entry DATE in the corresponding record.

In step 70, web wrapper software 36 compares the current date reported by the system clock to the date information under entries DATE in the record in access configuration file 38. If the date information includes the current date, operation proceeds to step 72, otherwise access is denied and operation returns to step 62 to wait for another page to be displayed. Web wrapper software 36 preferably provides an indication to the operator that the access attempt has failed and may additionally redisplay the previously displayed web page.

In step 72, web wrapper software 36 reads entry TIME in the corresponding record.

In step 74, web wrapper software 36 compares the current time reported by the system clock to the time information under entries TIME in the record in access configuration file 38. If the time information includes the current time, operation proceeds to step 76, otherwise access is denied and operation returns to step 62 to wait for another page to be displayed. Web wrapper software 36 preferably provides an indication to the operator that access has failed and may additionally redisplay the previously displayed web page.

In step 76, web wrapper software 36 causes web browser software 32 to retrieve and display the web page associated with the recorded address. Operation returns to step 62 to await another access attempt.

Although the present invention has been described with particular reference to certain preferred embodiments thereof, variations and modifications of the present invention can be effected within the spirit and scope of the following claims.

We claim:

1. A method of limiting access to a web page by an operator of a public-use network kiosk comprising the steps of:
    (a) receiving a request from the operator to display the web page by the kiosk, wherein the kiosk allows the operator unlimited access to begin use of the kiosk;
    (b) determining an address of the web page;
    (c) determining a current time of day;
    (d) from a schedule, determining an unacceptable period of the day associated with the address during which all access to the web page by all users is prohibited; and
    (e) preventing access to the web page if the current time falls within the unacceptable period determined from the schedule.

2. The method as recited in claim 1, wherein step d comprises the substep of:
    (d-1) determining a current date; and
    (d-2) from the schedule, determining that the day is the current date.

3. A method of limiting access to a web page by an operator of a public-use network kiosk comprising the steps of:

receiving a request from the operator to display the web page by the kiosk, wherein the kiosk allows the operator unlimited access to begin use of the kiosk;
determining an address of the web page;
comparing the address to a list of addresses;
if the address is in the list of addresses,
- determining a current time of day and a current date;
- from a schedule, determining an unacceptable date and an unacceptable time period associated with the address during which all access to the web page by all users is prohibited; and
- preventing all access to the web page if the current date is the unacceptable date and the current time of day falls within the unacceptable time period determined from the schedule.

4. A public-use network kiosk comprising:
a display for displaying web pages;
an input device for selecting the web pages; and
a computer which allows an operator unlimited access to begin use of the kiosk, which receives a request from the operator to display a first web page from the input device, determines an address of the first web page, determines a current time of day, determines from a schedule an unacceptable period of the day associated with the address during which all access to the first web page by all users is prohibited, and prevents access to the first web page if the current time falls within the unacceptable period determined from the schedule.

* * * * *